United States Patent
Ryu

(10) Patent No.: US 12,432,051 B2
(45) Date of Patent: Sep. 30, 2025

(54) SHARE HARDENING METHOD FOR MULTI-FACTOR THRESHOLD SECRET SHARING

(71) Applicants: Industry-University Cooperation Foundation Hanyang University, Seoul (KR); LTCware Inc., Seoul (KR)

(72) Inventor: Min Soo Ryu, Seoul (KR)

(73) Assignees: Industry-University Cooperation Foundation Hanyang University, Seoul (KR); LTCware Inc., Seoul (KR)

(*) Notice: Subject to any disclaimer, the term of this patent is extended or adjusted under 35 U.S.C. 154(b) by 244 days.

(21) Appl. No.: 18/139,018

(22) Filed: Apr. 25, 2023

(65) Prior Publication Data

US 2024/0340165 A1  Oct. 10, 2024

(30) Foreign Application Priority Data

Apr. 7, 2023 (KR) .................. 10-2023-0046386

(51) Int. Cl.
*H04L 29/06* (2006.01)
*H04L 9/08* (2006.01)
*H04L 9/30* (2006.01)

(52) U.S. Cl.
CPC ............ *H04L 9/085* (2013.01); *H04L 9/3093* (2013.01)

(58) Field of Classification Search
CPC .............................. H04L 9/085; H04L 9/3093
See application file for complete search history.

(56) References Cited

U.S. PATENT DOCUMENTS

| | | | |
|---|---|---|---|
| 9,813,243 B1 * | 11/2017 | Triandopoulos | H04L 63/061 |
| 9,929,860 B1 * | 3/2018 | Triandopoulos | H04L 9/0863 |
| 10,985,911 B2 | 4/2021 | Srinivasan | |
| 11,736,459 B2 * | 8/2023 | Wang | H04L 9/3093 |

(Continued)

FOREIGN PATENT DOCUMENTS

| | | |
|---|---|---|
| KR | 10-2021-0082201 A | 7/2021 |
| KR | 10-2023-0012676 A | 1/2023 |

OTHER PUBLICATIONS

De Souza et al., "Secret Sharing Schemes with Hidden Sets", 2018 IEEE Symposium on Computers and Communications (ISCC), Date of Conference: Jun. 25-28, 2018.*

(Continued)

*Primary Examiner* — Morshed Mehedi
(74) *Attorney, Agent, or Firm* — Bridgeway IP Law Group, PLLC; Sang Ho Lee; Hyun Woo Shin

(57) ABSTRACT

Provided is a share hardening method for multi-factor threshold secret sharing which includes an arbitrary share predetermined by a user and is capable of guaranteeing a security. The share hardening method for multi-factor threshold secret sharing may include an operation of accepting at least one predetermined first share value, an operation of randomly generating at least one second share value corresponding to the at least one predetermined first share value, an operation of determining an aggregate share using the at least one predetermined first share value and the at least one second share value, an operation of generating a polynomial for threshold secret sharing based on the determined aggregate share, and an operation of generating the remaining full shares based on the generated polynomial.

9 Claims, 17 Drawing Sheets

(56) References Cited

U.S. PATENT DOCUMENTS

| | | | |
|---|---|---|---|
| 2019/0312731 A1* | 10/2019 | Eldefrawy | H04L 9/085 |
| 2020/0412528 A1* | 12/2020 | Saint | H04L 9/3234 |
| 2022/0121884 A1* | 4/2022 | Zadeh | G06N 3/006 |
| 2023/0163977 A1* | 5/2023 | Pettit | H04L 9/3255 |
| | | | 713/176 |
| 2024/0178989 A1* | 5/2024 | Dolev | G06N 3/02 |

OTHER PUBLICATIONS

Cheong-Hyeon Choi, "Study on Threshold Scheme based Secure Secret Sharing P2P System", Journal of Internet Computing and Services(JICS), Jun. 2022, pp. 21-33.

Spranger Stephanie, "Extended European Search Report issued for EP Application No. 23169715.2", Sep. 26, 2023, EPO, Munich.

* cited by examiner

SHARE HARDENING METHOD FOR MULTI-FACTOR THRESHOLD SECRET SHARING

CROSS-REFERENCE TO RELATED APPLICATIONS

This application claims the priority of Korean Patent Application No. 10-2023-0046386 filed on Apr. 7, 2023 in the Korean Intellectual Property Office, the disclosure of which is incorporated herein by reference.

BACKGROUND

Field

The disclosure relates to a share hardening method for multi-factor threshold secret sharing, and more particularly, to a threshold secret sharing method which includes an arbitrary share predetermined by a user, and is capable of guaranteeing a security.

Description of the Related Art (t, n) threshold secret sharing (TSS) refers to a method which may generate n shares from a secret S, and then reconstruct the secret S using any t shares among n shares.

Representative threshold secret sharing methods include Shamir's secret sharing methods using a polynomial and Blakely's secret sharing method using geometric properties. For example, in the Shamir's secret sharing method using a polynomial, a constant term of a polynomial is set as the secret S, and n points through which the polynomial passes are chosen as the share, and then the polynomial is restored by any t points to find the secret S. When the secret sharing methods are used, shares are kept at distributed places, so a secrecy of the secret S is increased and a risk of losing the secret is also lowered.

However, since the secret sharing methods derive the share from a polynomial or a plane which is randomly generated, the secret sharing methods generate a complex and long type share.

For example, the share generated from the polynomial or plane is not memorizable and is difficult to manage, and as a result, a computer system or a separate digital device is required to keep and manage the share.

SUMMARY

When a password which is memorizable or biometric information such as fingerprint may be used, a separate computer or digital device is not required, and the usability of secret sharing may be improved.

For example, when a conventional method is slightly modified, it is possible to use a predetermined value as a share like the password or the biometric information. However, using information such as the password or biometric information as the share may be difficult to ensure security. When the predetermined value is not random or its entropy is low, an adversary may deduce a secret S only by (t−1) shares through guessing the predetermined value or a brute force attack.

According to the various exemplary embodiments of the present disclosure, a share hardening method for multi-factor threshold secret sharing may guarantee security and safety of secret sharing while using a value predetermined by a user as a share like a password or biometric information.

According to various exemplary embodiments of the present disclosure, in a share hardening method for multi-factor threshold secret sharing, an object is to provide a share hardening method that allows to use knowledge of a user such as a password and/or inherence of the user such as biometric information as the share. When the provided method is used, multi-factor secret sharing capable of reconstructing the secret using various elements will be possible.

According to various exemplary embodiments, a share hardening method for multi-factor threshold secret sharing may include: an operation of accepting at least one predetermined first share value; an operation of randomly generating at least one second share value corresponding to the at least one predetermined first share value; an operation of determining an aggregate share using the at least one predetermined first share value and the at least one second share value; an operation of generating a polynomial for threshold secret sharing based on the determined aggregate share; and an operation of generating the remaining full shares based on the generated polynomial.

According to various exemplary embodiments, a share hardening method for multi-factor threshold secret sharing may include: an operation of generating an arbitrary polynomial for threshold secret sharing; an operation of accepting at least one predetermined first share value; an operation of generating m−1 second share values by a random method; an operation of determining an aggregate share using the at least one predetermined first share value and the generated m−1 second share values, and acquiring a last second share value; and an operation of generating the remaining full shares based on the generated polynomial.

According to various exemplary embodiments, a share hardening method for multi-factor threshold secret sharing may include: an operation of generating full shares using an arbitrary secret sharing method; an operation of determining one share of the full shares as an aggregate share; an operation of accepting at least one predetermined first share value; an operation of generating a polynomial for the threshold secret sharing based on the aggregate share and the at least one first share value; and an operation of generating at least one second share value corresponding to the at least one first share value based on the generated polynomial.

According to various exemplary embodiments of the present disclosure, a share hardening method for multi-factor threshold secret sharing may improve a security by further using a password and/or biometric information having low risk of electronic hacking or replication in a threshold secret sharing method.

According to various exemplary embodiments of the present disclosure, a share hardening method for multi-factor threshold secret sharing may improve the usability of secret sharing by using a password and/or biometric information that does not require a separate computer or digital device for storage and provides excellent accessibility.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
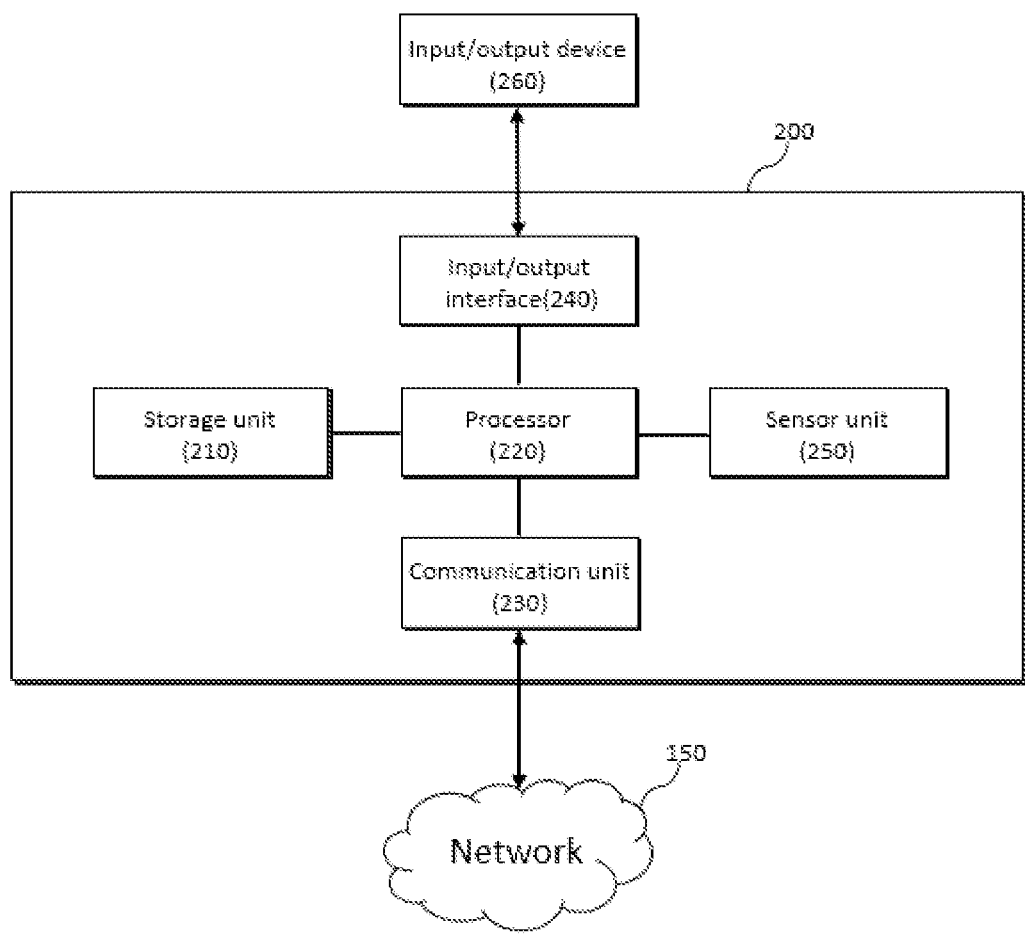
FIG. 1 is a diagram illustrating some components for implementing a threshold secret sharing environment 100 according to an exemplary embodiment of the present disclosure.

The present disclosure may have various modifications and various exemplary embodiments and specific exemplary embodiments will be illustrated in the drawings and described in detail. However, this does not limit the present disclosure to specific exemplary embodiments, and it should be understood that the present disclosure covers all the modifications, equivalents and replacements included within the idea and technical scope of the present disclosure. In describing each drawing, reference numerals refer to like elements.

Terms including as first, second, A, B, and the like are used for describing various constituent elements, but the constituent elements are not limited by the terms. The terms are used only to discriminate one constituent element from another component. The terms are used only to discriminate one constituent element from another component. A term 'and/or' includes a combination of a plurality of associated disclosed items or any item of the plurality of associated disclosed items.

It should be understood that, when it is described that a component is "connected to" or "accesses" another component, the component may be directly connected to or access the other component or a third component may be present therebetween. In contrast, when it is described that a component is "directly connected to" or "directly accesses" another component, it is understood that no element is present between the element and another element.

Terms used in the present application are used only to describe specific embodiments, and are not intended to limit the present disclosure. A singular form may include a plural form if there is no clearly opposite meaning in the context. Further, in the present application, it should be understood that the term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

If it is not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

Hereinafter, a preferred embodiment of the present disclosure will be described in detail with reference to the accompanying drawings.

FIG. 1 is a diagram illustrating some components for implementing a threshold secret sharing environment 100 according to an exemplary embodiment of the present disclosure.

Referring to FIG. 1, it is assumed that in the threshold secret sharing environment 100, a plurality of electronic devices 110, 120, and 130 may be connected through a network 150 wiredly or wirelessly, and may share or reconstruct a secret through the network 150.

FIG. 1 is an example for description of the present disclosure, and the number of electronic devices is not limited to that in FIG. 1, and the threshold secret sharing environment 100 is just one example of environments applicable to the exemplary embodiments, and the environment applicable to the exemplary embodiment is not limited to the threshold secret sharing environment 100 of FIG. 1.

According to various exemplary embodiments, a plurality of user terminals 110, 120, and 130 may be a fixed electronic device or a mobile electronic device implemented by a computer device. The plurality of user terminal devices 110, 120, and 130 may include, for example, a smart phone, a portable phone, a navigation, a computer, a laptop, a digital broadcasting terminal, personal digital assistants (PDA), a portable multimedia player (PMP), and a tablet PC.

As an example, in FIG. 1, as an example of the first electronic device 110, a shape of the smart phone is illustrated, but in the various exemplary embodiments of the present disclosure, the first electronic device 110 may mean one of various physical computer devices which may substantially communicate with other electronic devices 120 and 130 through the network 150 using a wireless or wired communication scheme.

A device for implementing the share hardening method for multi-factor threshold secret sharing according to the exemplary embodiment of the present disclosure may be one of the plurality of user terminal devices 110, 120, and 130. For example, the first electronic device 110 may generate a share for threshold secret sharing, and the second electronic device 120 and the third electronic device 130 may participate in the threshold secret sharing, and may be shared with the share from the first electronic device 110.

A communication scheme of the network 150 is not limited, and may include a communication scheme utilizing a communication network (e.g., a mobile communication network, a wired internet, a wireless internet, and a broadcasting network) which may include the network 150, and also include short-range wireless communication. For example, the network 150 may include one or more arbitrary networks among networks such as a personal area network (PAN), a local area network (LAN), a campus area network (CAN), a metropolitan area network (MAN), a wide area network (WAN), and a broadband network (BBN).

Figure 2:
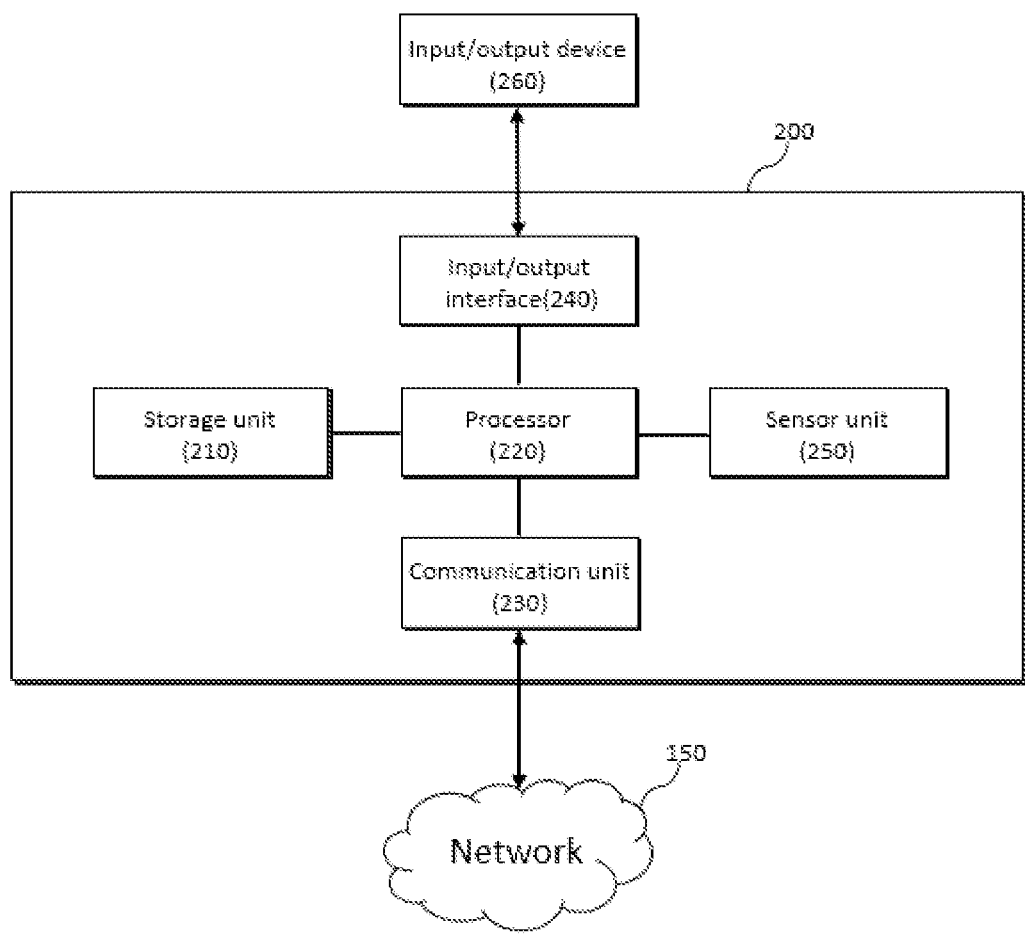
FIG. 2 is a block diagram illustrating some components of an electronic device 200 according to an exemplary embodiment of the present disclosure.

FIG. 2 is a block diagram illustrating some components of an electronic device 200 according to an exemplary embodiment of the present disclosure. Each of the plurality of user terminal devices 110, 120, and 130 described above may be implemented by the electronic device 200 illustrated through FIG. 2, and a method for generating the share based on threshold secret sharing according to an exemplary embodiment may be implemented by the electronic device 200.

Referring to FIG. 2, the electronic device 200 may include a storage unit 210, a processor 220, a communication unit 230, an input/output interface 240, and a sensor unit 250.

The storage unit 210 as a computer-readable recording medium may include a permanent mass storage device such as a random access memory (RAM), a read only memory (ROM), and a disk drive. Here, the permanent mass storage device such as the ROM and the disk device as a separate permanent storage device distinguished from the storage unit 210 may also be included in the electronic device 200.

Further, the storage unit 210 may store an operating system and at least one program code. The software components may be loaded to the storage unit 210 from a separate computer-readable recording medium apart from the storage unit 210. The separate computer-readable recording medium may include computer-readable recording media such as a floppy drive, a disk, a tape, a DVD/CD-ROM drive, and a memory card. In another exemplary embodiment, the software components may also be loaded to the storage unit 210 through the communication unit 230 rather than the computer-readable recording medium. For example, the software components may be loaded to the storage unit 210 of the electronic device 200 based on a computer program installed by files received through the network 150.

According to various exemplary embodiments, the storage unit 210 may store a password designated by a user or biometric information.

The processor 220 as a component that controls an overall operation of the electronic device 200 may be configured to perform basic arithmetic, logic, and input/output operations to process an instruction of the computer program. The instruction may be provided to the processor 220 by the storage unit 210 or the communication unit 230. For example, the processor 220 may be configured to execute an instruction received according to a program code stored in the recording device such as the storage unit 210.

The processor 220 may be configured, for example, to accept at least one predetermined first share value, randomly generate at least one second share value corresponding to the at least one predetermined first share value, determine an aggregate share using the at least one predetermined first share value and the at least one second share value, generate a polynomial for threshold secret sharing based on the determined aggregate share, and generate the remaining full share based on the generated polynomial.

The processor 220 may be configured, for example, to generate an arbitrary polynomial for threshold secret sharing, accept at least one predetermined first share value, generate m−1 second share values (hardening shares) by a random method, determine an aggregate share using at least one of the predetermined first share value and the generated m−1 second share values, acquire a last second share value, and generate the remaining full shares based on the generated polynomials.

The processor 220 may be configured, for example, to generate the full shares using an arbitrary secret sharing method, determine one share of the full shares as the aggregate share, accept at least one predetermined first share value, generate a polynomial for threshold secret sharing based on the aggregate share and the at least one first share value, and generate at least one second share value corresponding to the at least one first share value based on the generated polynomial.

The communication unit 230 may provide a function for mutual communication with other devices (e.g., the above-described storage devices) through the network 150. As an example, the processor 220 of the electronic device 200 may deliver a request or an instruction, data, or a file generated according to the program code stored in the recording device such as the storage unit 210 to other devices through the network 150 according to the control of the communication unit 230.

On the other hand, the electronic device 200 may receive signals, instructions, data, and files from other devices through the communication unit 230 via the network 150. The signal, the instruction, and the data received through the communication unit 230 may be delivered to the processor 220 or the storage unit 210, and the file may be stored in a storage medium (the above described permanent storage device) which may be further included in the electronic device 200.

The input/output interface 240 may be a means for interfacing with the input/output device 260. For example, the input device may include a microphone, a keyboard, or a mouse, and the output device may include devices such as a display and a speaker. As another example, the input/output interface 240 may also be a means for interfacing with a device in which functions for an input and an output are integrated into one, such as a touch screen.

The sensor module 250 may sense an operation state (e.g., power or temperature) of the electronic device 200, or an external environmental state (e.g., user state), and generate an electric signal or a data value corresponding to the sensed state. According to an exemplary embodiment, the sensor module 250 may include, for example a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

Figure 3:
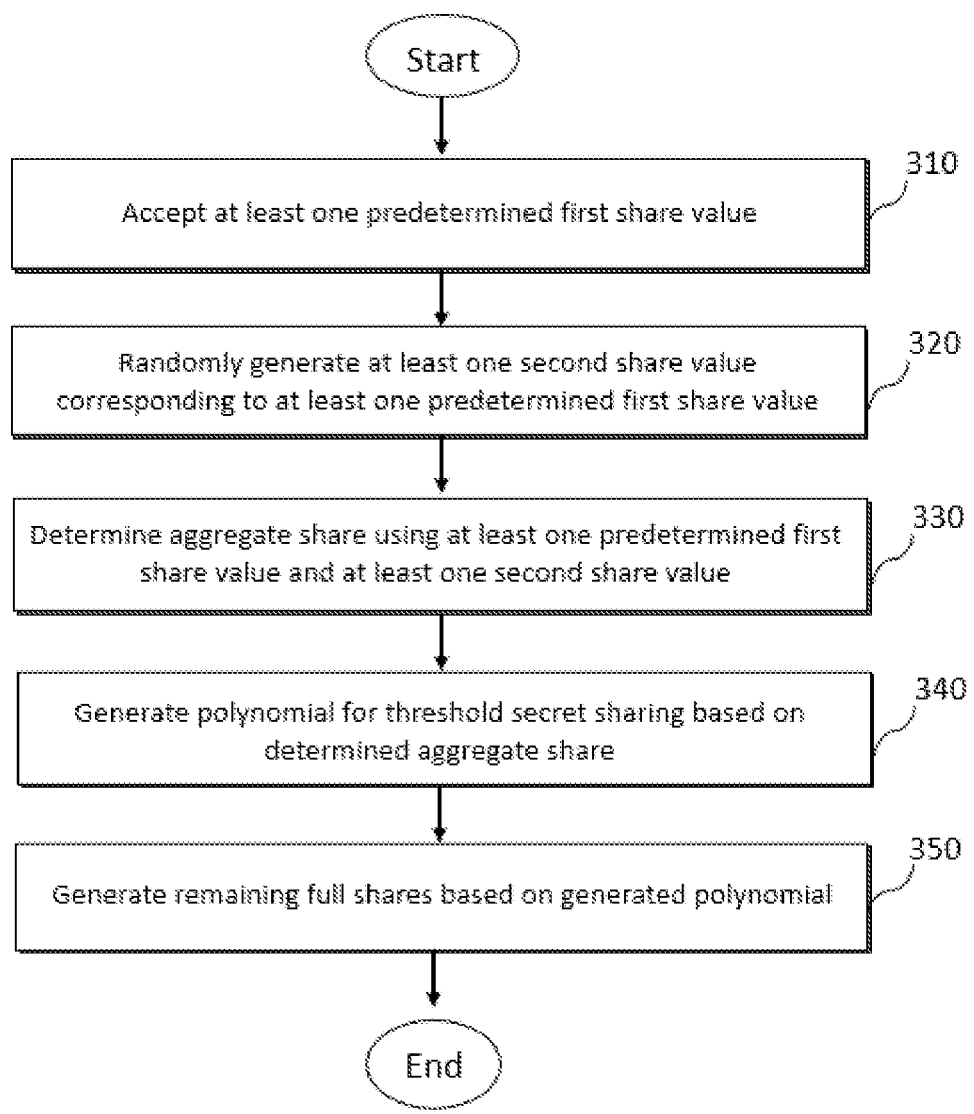
FIG. 3 is a flowchart illustrating an unconstrained share generation method of a share hardening method for multi-factor threshold secret sharing according to various exemplary embodiments of the present disclosure.

Further, in another exemplary embodiments, the electronic device 200 may include more components or less components than the components of FIG. 2. However, most conventional technical components need not be clearly illustrated. For example, the electronic device 200 may be implemented to include at least some of the above described input/output devices 250 or may also further include other components such as a transceiver or a database. FIG. 3 is a flowchart illustrating an unconstrained share generation method of a share hardening method for multi-factor threshold secret sharing according to various exemplary embodiments of the present disclosure.

Referring to FIG. 3, in operation 310, an electronic device (e.g., the electronic devices 110, 120, and 130 of FIG. 1 or the electronic device 200 of FIG. 2) may accept at least one predetermined first share value.

A first share (or referred to as 'predetermined share') means, for example, a share predetermined by the user, such as the password or biometric information. Since conventional secret sharing methods first determine a polynomial or a geometric object, and then derives the share therefrom, the conventional secret sharing methods generate a complex and long type share. The generated share is not memorizable and is difficult to manage, and there is a problem in that a computer system or a separate digital device should be used to keep and manage the share. However, when a password which is memorizable or biometric information such as fingerprint may be used as the share, a separate device for keeping the share is not required, and the usability of secret sharing may be significantly improved due to excellent accessibility.

In operation 320, the electronic device (e.g., the electronic devices 110, 120, and 130 of FIG. 1 or the electronic device 200 of FIG. 2) may randomly generate at least one second share value corresponding to at least one predetermined first share value.

For example, one or more second shares (or referred to as 'hardening share') having randomness and sufficient entropy may bind to a preselected first share (or 'predetermined share').

According to various exemplary embodiments, the electronic device may determine m hardening shares $h_1$, $h_2$, ..., $h_m$ binding to a predetermined share p. In order to distinguish the full share generated by the conventional secret sharing method, a first share (predetermined share) and a second share (hardening share) may be referred to as partial shares.

In the present disclosure, there is no limit in the number of predetermined shares (first shares), but in the present disclosure, for convenience of description, only a case where m hardening shares (second shares) are binding to one predetermined share is described as an example. The share hardening method for multi-factor threshold secret sharing according to various exemplary embodiments of the present disclosure may extend the predetermined share (first share) to a plurality of shares, and the number of predetermined shares is not limited to one. Secret sharing using m hardening shares with one predetermined share is expressed as (t, (m), n) secret sharing. If one predetermined share is used, but no hardening share is used, this may be expressed as (t, (0), n) secret sharing, and this is distinguished from conventional (t, n) secret sharing which does not use a predetermined share.

In operation 330, the electronic device (e.g., the electronic devices 110, 120, and 130 of FIG. 1 or the electronic device 200 of FIG. 2) may determine the aggregate share using at least one predetermined first share value and at least one second share value.

For example, when the share generated by the conventional threshold secret sharing method is referred to as the full share, information which may be acquired by aggregating all the predetermined share p and m hardening shares is referred to as the aggregate share. Compared with the full share generated by the conventional method, the aggregate share is defined and generated in a different manner, but the aggregate share and the full share may be used equally when the secret is reconstructed. When the total number of aggregate shares and the full shares becomes t, it becomes possible to reconstruct the secret.

According to various exemplary embodiments of the present disclosure, the (t, (m), n) secret sharing method may use a partial share which satisfies following two properties.

(Property 1) When the determined share and m hardening shares are all aggregated, a full share or equivalent information to a full share may be obtained. This is a property for reconstruction of the secret, and when the predetermined share and the hardening share are all aggregated, the secret S may be found jointly with (t−1) other full shares.

(Property 2) No information on the aggregate share may be found by (m−1) hardening shares. This is a property for secrecy of the aggregate share. Theoretically, when a probability that the aggregate share to be found with (m−1) hardening shares and a probability that the aggregate share to be found with no hardening share are equal to each other, property 2 is satisfied.

Property 2 is related to perfect secrecy for the secret S. In general, when no information related to the secret S may be deduced by shares of a number less than t, a (t, n) threshold secret sharing system is said to have perfect security. When the hardening share satisfying property 2 is applied to the conventional (t, n) secret sharing method providing the perfect security, no information on the secret S may be found by (t−1) full shares and (m−1) hardening shares. When property 2 is satisfied, (m−1) hardening shares do not help finding the aggregate share, and as a result, information which may be used to find the secret is just (t−1) full shares. When the conventional (t, n) secret sharing method to which the present disclosure is to be applied provides the perfect security, no information on the secret S may be found by (t−1) full shares and (m−1) hardening shares.

In operation 340, the electronic device (e.g., the electronic devices 110, 120, and 130 of FIG. 1 or the electronic device 200 of FIG. 2) may generate the polynomial for threshold secret sharing based on the determined aggregate share. For example, the electronic device may generate a polynomial of degree (t−1) $f(x)=a_{t-1}x^{t-1}+a_{t-2}x^{t-2}+\ldots+S$ in which the secret S is included in a constant term.

In operation 350, the electronic device (e.g., the electronic devices 110, 120, and 130 of FIG. 1 or the electronic device 200 of FIG. 2) may generate the remaining full shares using the generated polynomial. For example, the electronic device may generate (n−1−m) full shares from (n−1−m) points that the polynomial f(x) passes through so that a total of n full shares and partial shares are generated.

Figure 4A:
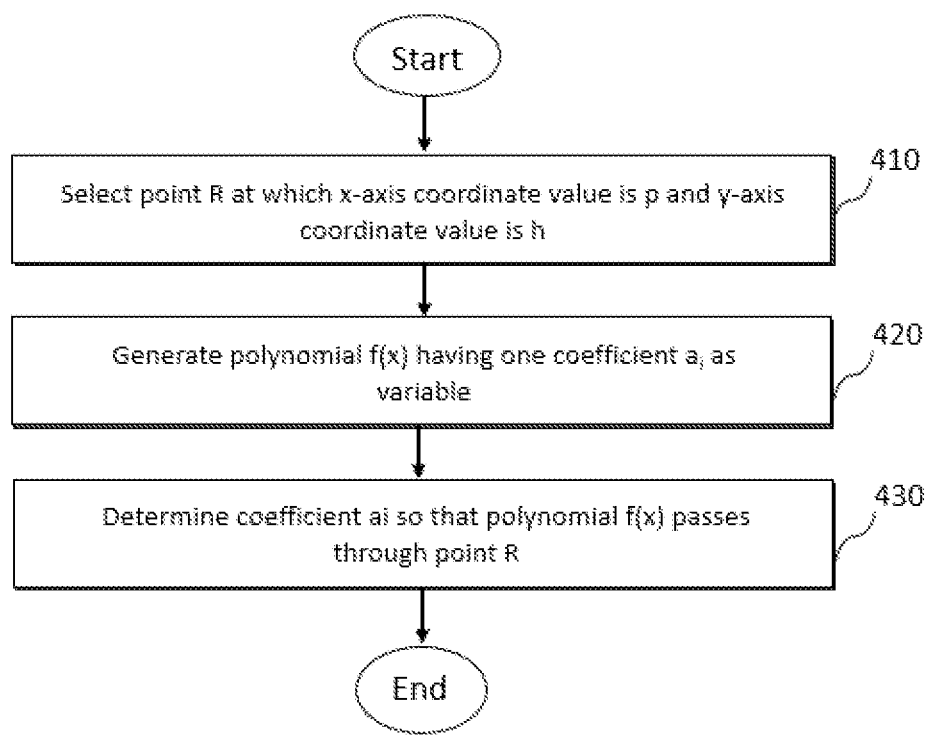
FIGS. 4A and 4B illustrate a polynomial generation method using an unconstrained point generation technique required for the unconstrained share generation method to generate a single hardening share according to various exemplary embodiments.
Figure 4B:
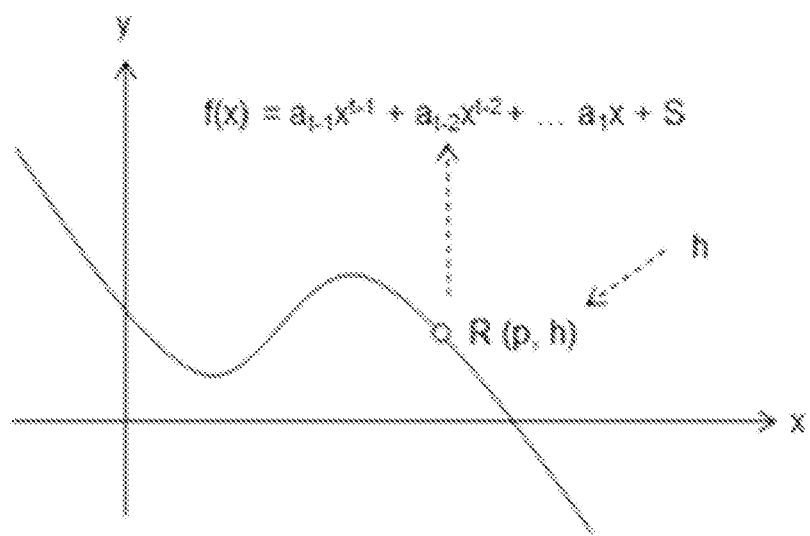

FIGS. 4A and 4B illustrate a polynomial generation method using an unconstrained point generation technique required for the unconstrained share generation method to generate a single hardening share according to various exemplary embodiments. In this method, the aggregate share determined by the predetermined share and the hardening share has a form of a point.

Referring to FIGS. 4A and 4B, a method for first selecting a point based on a single hardening share and determining the polynomial using an unconstrained point generation technique is illustrated.

Referring to FIG. 4A, in operation 410, the electronic device (e.g., the electronic devices 110, 120, and 130 of FIG. 1 or the electronic device 200 of FIG. 2) may select a point R at which an x-axis coordinate value is the first share value and a y-axis coordinate value is the second share value.

For example, a point R(p, h) at which the x-axis coordinate value is a first predetermined share p and the y-axis coordinate value is a hardening share h may be selected. For example, referring to FIG. 4B, a point corresponding to R(p, h) may be selected.

In operation 420, the electronic device (e.g., the electronic devices 110, 120, and 130 of FIG. 1 or the electronic device 200 of FIG. 2) may generate the polynomial having a coefficient $a_i$ as a variable.

For example, the electronic device may generate the polynomial of degree $(t-1)f(x)=a_{t-1}x^{t-1}+a_{t-2}x^{t-2}+\ldots+S$ by randomly generating the remaining coefficients other than $a_i$ while setting one coefficient $a_i$ as the variable.

In operation 430, the electronic device (e.g., the electronic devices 110, 120, and 130 of FIG. 1 or the electronic device 200 of FIG. 2) may determine the coefficient $a_i$ so that the polynomial passes through the point R.

Figure 5A:
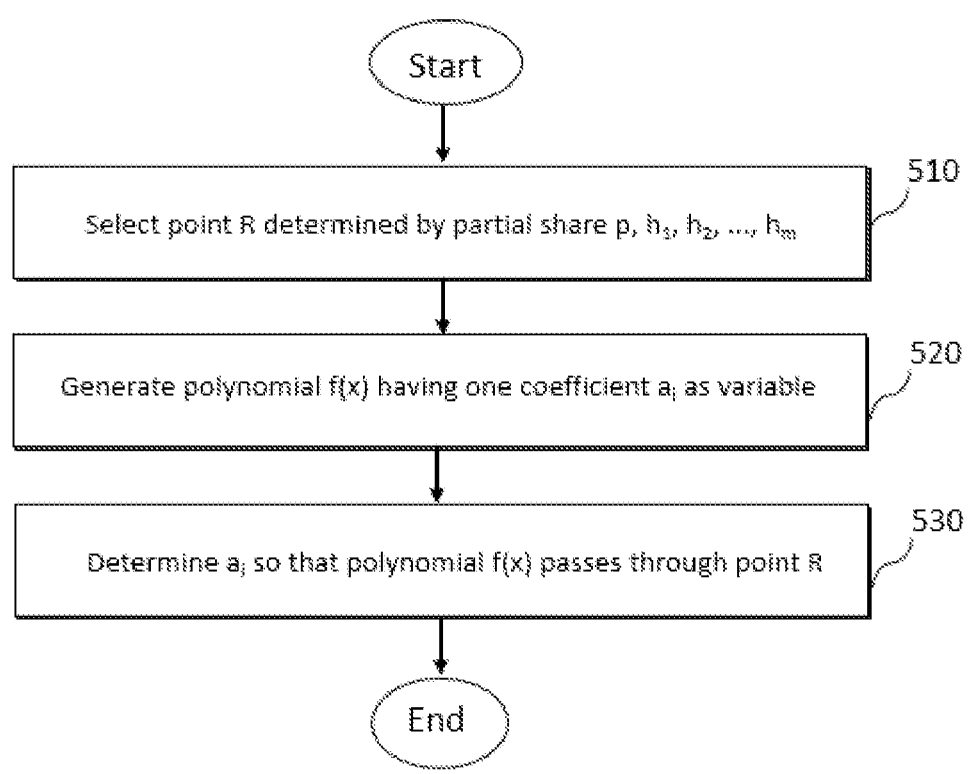
FIGS. 5A and 5B illustrate a polynomial generation method using the unconstrained point generation technique required for the unconstrained share generation method to generate a plurality of hardening shares according to various exemplary embodiments.
Figure 5B:
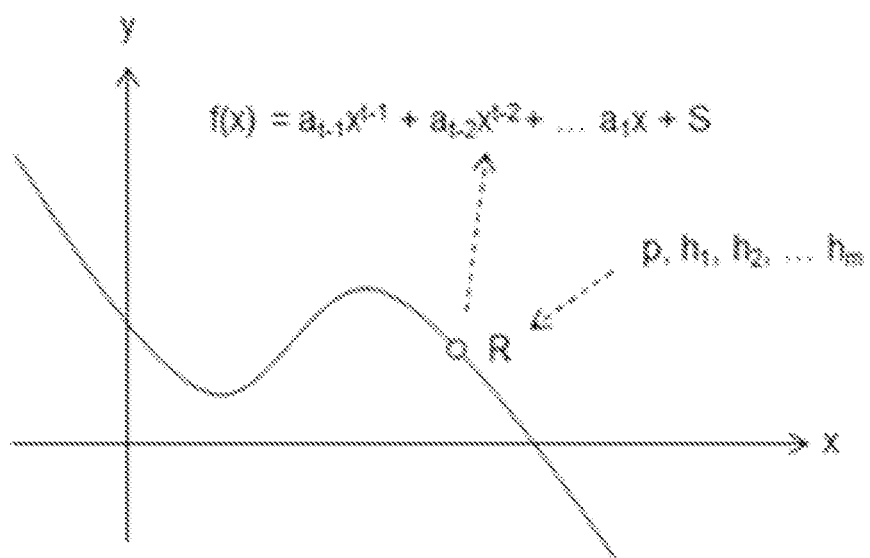

FIGS. 5A and 5B illustrate a polynomial generation method using the unconstrained point generation technique required for the unconstrained share generation method to generate a plurality of hardening shares according to various exemplary embodiments.

Referring to FIGS. 5A and 5B, a method for first selecting a point based on a plurality of hardening shares and determining the polynomial using a constrained point generation technique is illustrated.

In operation 510, the electronic device (e.g., the electronic devices 110, 120, and 130 of FIG. 1 or the electronic device 200 of FIG. 2) may select a point R determined by partial shares $p, h_1, h_2, \ldots, h_m$.

According to various exemplary embodiments, the electronic device may determine the point R using an entropy preserving function g( ) in order to satisfy property 2. When a coordinate value of the point R is determined by applying the function g( ) to the partial shares $p, h_1, h_2, \ldots, h_m$, the point R corresponding to the aggregate share may not be found if even any one of the hardening shares $h_1, h_2, \ldots, h_m$ is not known. The reason is that $h_1, h_2, \ldots, h_m$ are randomly generated, and g( ) preserves the entropy.

According to various exemplary embodiments, the entropy preserving g( ) may include an encryption algorithm, a one way function, a pseudo random number generator, and a pseudo random function. For example, XOR encryption may be used, and when an XOR operator is represented by $\oplus$, $g(p, h_1, h_2, \ldots, h_{m-1})=p\oplus h_1 \oplus h_2 \oplus \ldots \oplus h_{m-1}$ may be established.

According to various exemplary embodiments, a method for selecting the point R uses one partial share as the x-axis or y-axis coordinate value of the point R, and uses the entropy preserving function g( ) for the remaining partial shares as the remaining coordinate value of the point R. In this case, a form of the aggregate share may become $(p, g(h_1, h_2, \ldots, h_m))$, $(h_i, g(h_1, h_2, \ldots, p, \ldots, h_m))$, $(g(h_1, h_2, \ldots, h_m), p)$, $(g(h_1, h_2, \ldots, p, \ldots, h_m), h_i)$, etc.

A method for selecting the point R according to yet another exemplary embodiments is to apply the entropy preserving functions $g_1(\ )$ and $g_2(\ )$ to the x-axis coordinate value and the y-axis coordinate value, respectively. In this case, the form of the aggregate share may become $(g_1(p, h_1, h_2, \ldots), g_2(h_i, \ldots, h_m))$. In this case, each partial share should be used at least once. For example, referring to FIG. 5B, the point R may be selected as a coordinate acquired using $p, h_1, h_2, \ldots, h_m$ at least once.

In operation 520, the electronic device (e.g., the electronic devices 110, 120, and 130 of FIG. 1 or the electronic device 200 of FIG. 2) may generate an arbitrary polynomial f(x) having one coefficient $a_i$ as the variable. For example, the electronic device may generate the polynomial of degree $(t-1)f(x)=a_{t-1}x^{t-1}+a_{t-2}x^{t-2}+\ldots+$, S by randomly generating the remaining coefficients other than $a_i$.

In operation 530, the electronic device (e.g., the electronic devices 110, 120, and 130 of FIG. 1 or the electronic device 200 of FIG. 2) may determine the coefficient $a_i$ so that the polynomial f(x) passes through the point R, and generate the polynomial for the threshold secret sharing.

Figure 6:
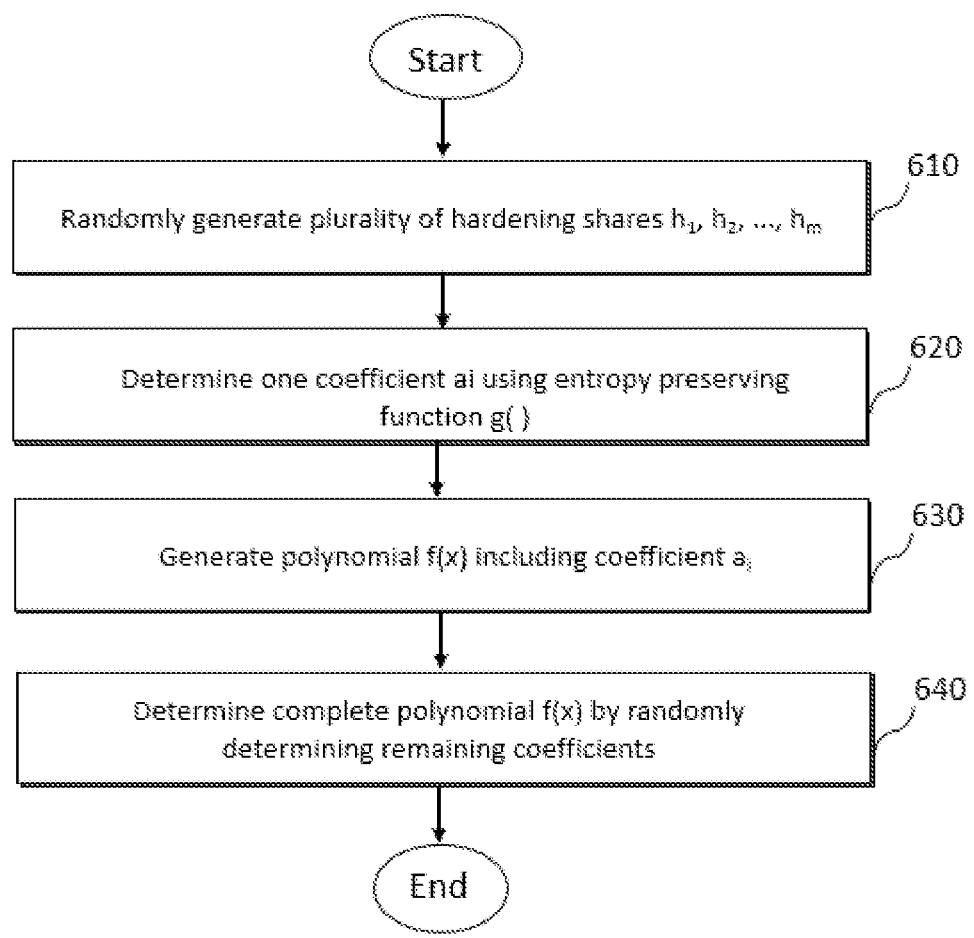
FIG. 6 illustrates a polynomial generation method using an unconstrained coefficient generation technique required for the unconstrained share generation method to generate at least one hardening share according to various exemplary embodiments.

FIG. 6 illustrates a polynomial generation method using an unconstrained coefficient generation technique required for the unconstrained share generation method to generate at least one hardening share according to various exemplary embodiments. The aggregate share determined by the predetermined share and the hardening share represents not the point but a coefficient of the polynomial or a plane equation. Therefore, the method may be applied to polynomial-based secret sharing like the Shamir's method or plane-based secret sharing like the Blakely's method.

Referring to FIG. 6, a method for determining the at least one hardening share and determining the polynomial using an unconstrained coefficient generation technique is illustrated.

In operation 610, the electronic device (e.g., the electronic devices 110, 120, and 130 of FIG. 1 or the electronic device 200 of FIG. 2) may randomly generate a plurality of hardening shares $h_1, h_2, \ldots, h_m$.

In operation 620, the electronic device (e.g., the electronic devices 110, 120, and 130 of FIG. 1 or the electronic device 200 of FIG. 2) may determine a coefficient $a_i$ using the entropy preserving function g( ) For example, the value of one coefficient $a_i$ is determined as $g(p, h_1, h_2, \ldots h_m)$. However, $a_i$ should not be a constant term used as the secret.

According to various exemplary embodiments, the entropy preserving function g( ) may include the encryption algorithm, the one way function, the pseudo random generator, and the pseudo random function. For example, XOR encryption may be used, and when an XOR operator is represented by $\oplus$, $g(p, h_1, h_2, \ldots, h_{m-1})=p\oplus h_1 \oplus h_2 \oplus \ldots \oplus h_{m-1}$ may be established.

In operation 630, the electronic device (e.g., the electronic devices 110, 120, and 130 of FIG. 1 or the electronic device 200 of FIG. 2) may generate the polynomial f(x) of degree (t-1) including the coefficient $a_i$ while having the remaining coefficients as variables.

In operation 640, the electronic device (e.g., the electronic devices 110, 120, and 130 of FIG. 1 or the electronic device 200 of FIG. 2) may determine the complete polynomial f(x) of degree (t-1) by randomly generating the remaining coefficients other than the coefficient $a_i$.

In the unconstrained coefficient generation technique, the aggregate share has the form of the coefficient, but still satisfies property 1. In general, a polynomial of degree (t-1) or a (t-1)-dimensional plane f( ) may be determined by either t distinct points or t coefficients. Further, the polynomial f( ) of degree (t-1) or (t-1)-dimensional plane f( ) may also be uniquely determined by (t-1) points and one coefficient. That is, the point and the coefficient may regard to be equivalent from the viewpoint of reconstructing the secret. Since the coefficient $a_i$ determined by $g(p, h_1, h_2, \ldots, h_m)$ may be used equivalently to one full share, property 1 is satisfied. Further, since the coefficient is determined using the entropy preserving function g( ) property 2 is also satisfied.

Referring back to FIG. 3, in operation 350, the electronic device (e.g., the electronic devices 110, 120, and 130 of FIG. 1 or the electronic device 200 of FIG. 2) may generate the remaining full shares based on the generated polynomial or plane f( ). For example, the electronic device may generate (n−2) full shares when using the single hardening share, and generate (n−m−1) full shares when using the plurality of hardening shares m.

Although not illustrated, the electronic device distributes the generated full shares to participants of a number corresponding to the number of full shares to share the secret.

First Exemplary Embodiment (Unconstrained Point Generation Technique)

An exemplary embodiment in which the present disclosure is applied to Shamir secret sharing on a finite field $F_q$ will be described. For convenience of calculation, 13 which is a prime number is assumed as a value of q. As a result, the secret S, the coefficient, the coordinate value, and the shares used in the secret sharing are all defined in $F_{13}$.

It is assumed that the secret value is determined as S=3 and the predetermined share is determined as p=5, and m hardening shares are generated.

1) When the single hardening share is generated (m=1), it is assumed that the hardening share h is first randomly generated, and the obtained value is h=8. In this case, the point R(p, h) which is to become the aggregate share becomes (5, 8). When it is assumed that the total number of the aggregate shares and the full shares required for reconstructing the secret is 3, that is t=3, a quadratic polynomial $f(x)=a_2x^2+a_1x+a_0=a_2x^2+9x+3$ may be generated by randomly generating the remaining coefficients other than one coefficient $a_2$. When the coefficient $a_2$ is determined so that the polynomial f(x) passes through a the point R (5, 8), f(x) may be acquired as follows.

$$f(5) = 25a_2 + 45 + 3 = 8 (\text{mod } 13)$$

$$25a_2 = -40 = 12 (\text{mod } 13)$$

Since the multiplicative inverse of 25 is 12 in $F_{13}$, $$25a_2 \times 12 = 12 \times 12 (\text{mod } 13)$$

$$a_2 = 144 = 1 (\text{mod } 13)$$

Therefore, the quadratic polynomial may become $f(x)=x^2+9x+3$.

The generated quadratic polynomial may be used for generating the full share by the same method as the conventional method. When there is a total of 5 shares which are to be generated by assuming n=5, three remaining full shares may be generated except for one predetermined share and one hardening share which are already determined. When the above determined polynomial $f(x)=x^2+9x+3$ is used, three full shares (1, 0), (2, 12), and (3, 0) may be obtained. This case is expressed as (3, (1), 5) secret sharing.

2) When the plurality of hardening shares is generated (m>1), m=3 is assumed. Three hardening shares $h_1$, $h_2$, and $h_3$ are first randomly generated, and the acquired values may be $h_1$=6 (=0110), $h_2$=8 (=1000), and $h_3$=2 (=0010), respectively. As already described, the method for determining R which is to become the aggregate share is diversified, and here, a form of $(p, g(h_1, h_2, \ldots, h_m))$ may be used. For example, when the XOR encryption is used as g( ) coordinates of the point R may become $(p, h1 \oplus h2 \oplus h3)$, and $h1 \oplus h2 \oplus h3$ may be calculated as follows.

$$h1 \oplus h2 \oplus h3 = 0110 \oplus 1000 \oplus 0010 = 1100 (=12)$$

Therefore, the coordinates of the point R become (5, 12). When it is assumed that the total number of the aggregate shares and the full shares required for reconstructing the secret is 3, that is t=3, the quadratic polynomial $f(x)=a_2x^2+a_1x+a_0=a_2x^2+9x+3$ may be generated by randomly generating the remaining coefficients other than one coefficient $a_2$. The coefficient $a_2$ may be determined so that the polynomial f(x) passes through the point R (5, 12).

$$f(5) = 25a_2 + 45 + 3 = 12 (\text{mod } 13)$$

$$25a_2 = -36 = 3 (\text{mod } 13)$$

Since the multiplicative inverse of 25 is 12 in $F_{13}$, $$25a_2 \times 12 = 3 \times 12 (\text{mod } 13)$$

$$a_2 = 36 = 10 (\text{mod } 13)$$

Therefore, the quadratic polynomial may become $f(x)=10x^2+9x+3$.

The generated quadratic polynomial may be used for generating the full share by the same method as the conventional method. When there is a total of 6 shares which are to be generated by assuming n=6, two remaining full shares may be generated except for one predetermined share and three hardening shares which are already determined. When the above determined polynomial f(x)=32 $10x^2+9x+3$ is used, two full shares (1, 9) and (2, 9) may be obtained. This case is expressed as (3, (3), 6) secret sharing.

Second Exemplary Embodiment (Unconstrained Coefficient Generation Technique)

An exemplary embodiment in which the present disclosure is applied to Shamir secret sharing on a finite field $F_q$ will be described. For convenience of calculation, 13 which is a prime number is assumed as a value of q. As a result, the secret S, the coefficient, the coordinate value, and the shares used in the secret sharing are all defined in $F_{13}$.

It is assumed that the secret value is determined as S=3 and the predetermined share is determined as p=5, and m hardening shares are generated.

When m=3, three hardening shares $h_1$, $h_2$, and $h_3$ may be first randomly generated. For example, it is assumed that the acquired values are $h_1$=6 (=0110), $h_2$=8 (=1000), and $h_3$=2

(=0010), respectively. Using the XOR encryption, the value of one coefficient $a_2$ may be determined as $p \oplus h1 \oplus h2 \oplus h$.

$$a_2 = p \oplus h1 \oplus h2 \oplus h3 = 0101 \oplus 0110 \oplus 1000 \oplus 0010 = 1011(=11).$$

When it is assumed that the total number of the aggregate shares and the full shares required for reconstructing the secret is 3, that is t=3, the quadratic polynomial $f(x)=a_2x^2+a_1x+a_0=11x^2+9x+3$ or a 2D plane $f(x_1, x_2)=11x_1+9x_2+3$ may be generated by randomly generating the remaining coefficients other than one coefficient a2.

The generated quadratic polynomial or 2D plane may be used for generating the full share by the same method as the conventional method. When there is a total of 6 shares which are to be generated by assuming n=6, two remaining full shares may be generated except for one predetermined share and three hardening shares which are already determined. When the above determined polynomial $11x^2+9x+3$ is used, two full shares (1, 10) and (2, 0) may be obtained. This case is expressed as (3, (3), 6) secret sharing.

Figure 7:
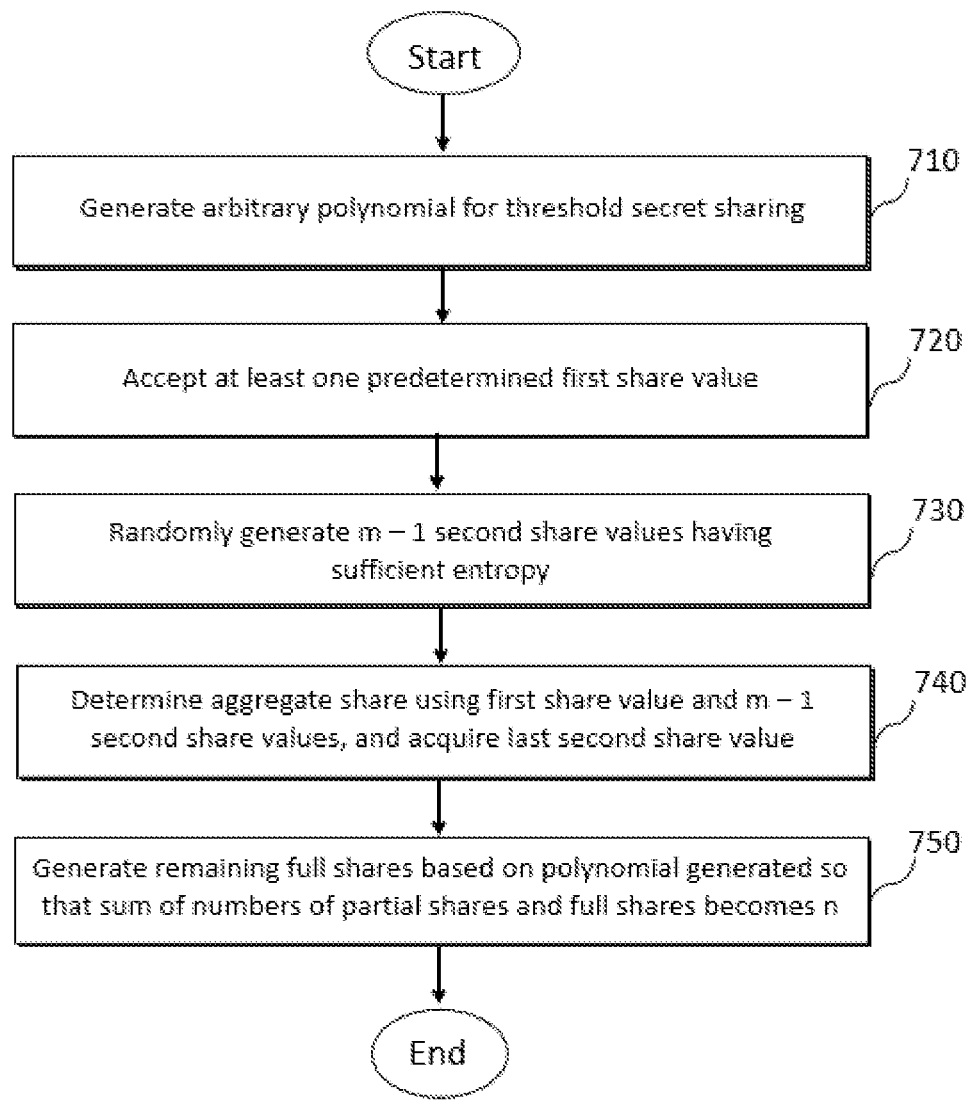
FIG. 7 is a flowchart illustrating a constrained share generation method of the share hardening method for multi-factor threshold secret sharing according to various exemplary embodiments.

FIG. 7 is a flowchart illustrating a constrained share generation method of the share hardening method for multi-factor threshold secret sharing according to various exemplary embodiments.

Referring to FIG. 7, in operation 710, the electronic device (e.g., the electronic devices 110, 120, and 130 of FIG. 1 or the electronic device 200 of FIG. 2) may generate an arbitrary polynomial for the threshold secret sharing. For example, the electronic device may generate a polynomial of degree $(t-1)f(x)=a_{t-1}x^{t-1}+a_{t-2}x^{t-2}+\ldots+S$ which has a random coefficient $a_i$ and has the secret S included in the constant term.

In operation 720, the electronic device (e.g., the electronic devices 110, 120, and 130 of FIG. 1 or the electronic device 200 of FIG. 2) may accept at least one predetermined first share value. The first share (or referred to as 'predetermined share') means, for example, a share predetermined by the user, such as the password or biometric information, and may be expressed as a unique value. When a password which is memorizable or biometric information such as fingerprint may be used as the share, a separate device for keeping the share is not required, and the usability of secret sharing may be significantly improved due to excellent accessibility.

In operation 730, when the plurality of hardening shares is intended to be used, m−1 second share (hardening share) values having sufficient entropy may be randomly generated. For example, when m hardening shares $h_1, h_2, \ldots, h_m$ binding to the predetermined share p are intended to be generated, the electronic device may pre-generate m−1 values corresponding to the hardening shares $h_1, h_2, \ldots, h_{m-1}$.

When a single second share (hardening share) is generated, operation 730 may be omitted.

In operation 740, the electronic device (e.g., the electronic devices 110, 120, and 130 of FIG. 1 or the electronic device 200 of FIG. 2) may determine the aggregate share using the first share value and generated m−1 second share values, and acquire a last second share value $h_m$. For example, the last hardening share $h_m$ may be determined by applying the entropy preserving function g( ) to the first share value and generated m−1 second share values. Specifically, the electronic device may select a point R at which the x-axis coordinate value is $g(p, h_1, h_2, \ldots, h_{m-1})$ by applying the entropy preserving function g( ) to a predetermined first share value p and the generated m−1 hardening shares $h_1, h_2, \ldots, h_{m-1}$, and calculate the y-axis coordinate value of the R using the generated polynomial f(x) and determine the calculated coordinate value as the last second share (hardening share) $h_m$.

As another example, when the single second share (hardening share) is generated, the y-axis coordinate value of a point having the first share value as the x-axis coordinate among the points of the generated polynomial f(x) may be determined as the second share (hardening share) value.

When the share generated by the conventional threshold secret sharing method is called the full share, information which may be acquired by aggregating all of the predetermined share p and m hardening shares is referred to as the aggregate share, which is distinguished from the full share.

In operation 750, the electronic device (e.g., the electronic devices 110, 120, and 130 of FIG. 1 or the electronic device 200 of FIG. 2) may generate the remaining full shares based on a polynomial generated so that the sum of the numbers of the partial shares and the full shares becomes n.

For example, the electronic device may generate n−m−1 remaining full shares based on the generated polynomial.

Although not illustrated, the electronic device distributes the generated full shares to participants of a number corresponding to the number of full shares to share the secret.

Figure 8A:
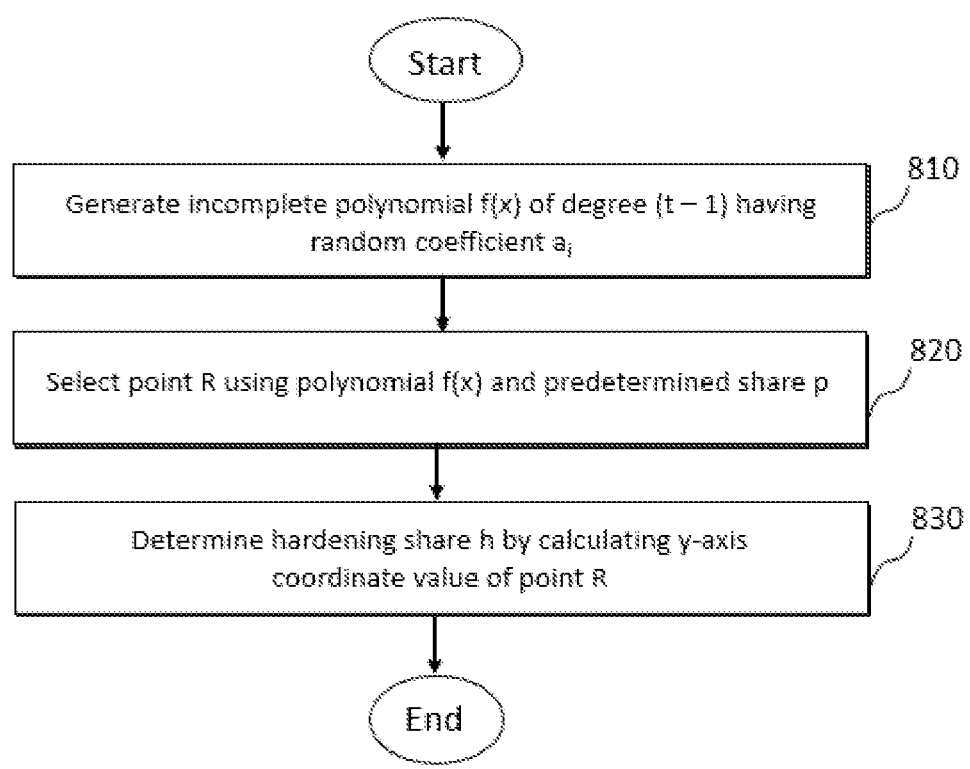
FIGS. 8A and 8B illustrate a method for generating a single hardening share from a predetermined polynomial using a constrained point selection technique according to various exemplary embodiments.
Figure 8B:
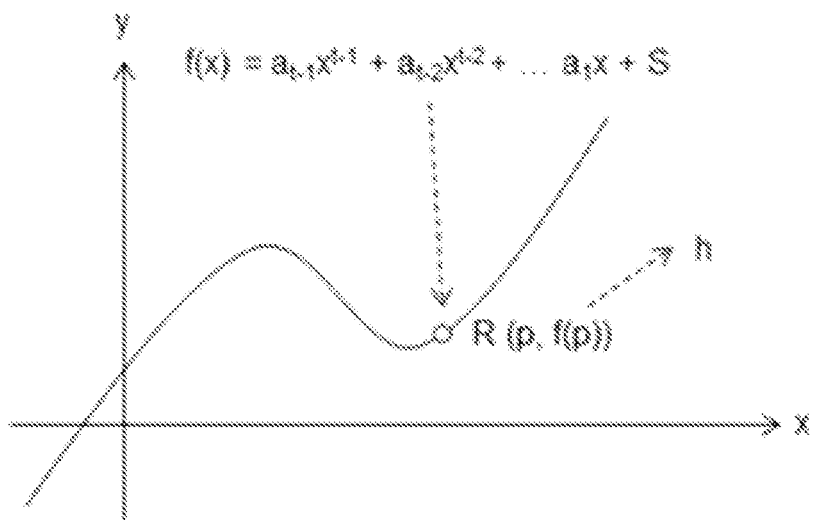

FIGS. 8A and 8B illustrate a method for generating a single hardening share from a predetermined polynomial using a constrained point selection technique.

Referring to FIG. 8, in operation 810, the electronic device (e.g., the electronic devices 110, 120, and 130 of FIG. 1 or the electronic device 200 of FIG. 2) may generate the polynomial f(x) of degree (t−1) including the random coefficient $a_i$.

For example, the electronic device may generate a polynomial of degree $(t-1)f(x)=a_{t-1}x^{t-1}+a_{t-2}x^{t-2}+\ldots+$, S which has the random coefficient $a_i$.

In operation 820, the electronic device (e.g., the electronic devices 110, 120, and 130 of FIG. 1 or the electronic device 200 of FIG. 2) may select the point R using the polynomial f(x) and the predetermined share p.

For example, the electronic device may select a point R at which the x-axis coordinate value is p among the points through which the polynomial f(x) passes. That is, the electronic device may select a point R(p, f(p)) using a y-axis coordinate value corresponding to f(p). For example, referring to FIG. 8B, the electronic device may select the point R(p, f(p)) using the polynomial.

In operation 830, the electronic device (e.g., the electronic devices 110, 120, and 130 of FIG. 1 or the electronic device 200 of FIG. 2) may determine the hardening share h by calculating the y-axis coordinate value of the point R.

For example, h=f(p), and the aggregate share may become the point R(p, h). Referring back to FIG. 7, in operation 750, the electronic device (e.g., the electronic devices 110, 120, and 130 of FIG. 1 or the electronic device 200 of FIG. 2) may generate the full share based on the polynomial.

Although not illustrated, the electronic device distributes the generated full shares to participants of a number corresponding to the number of full shares to share the secret.

Figure 9A:
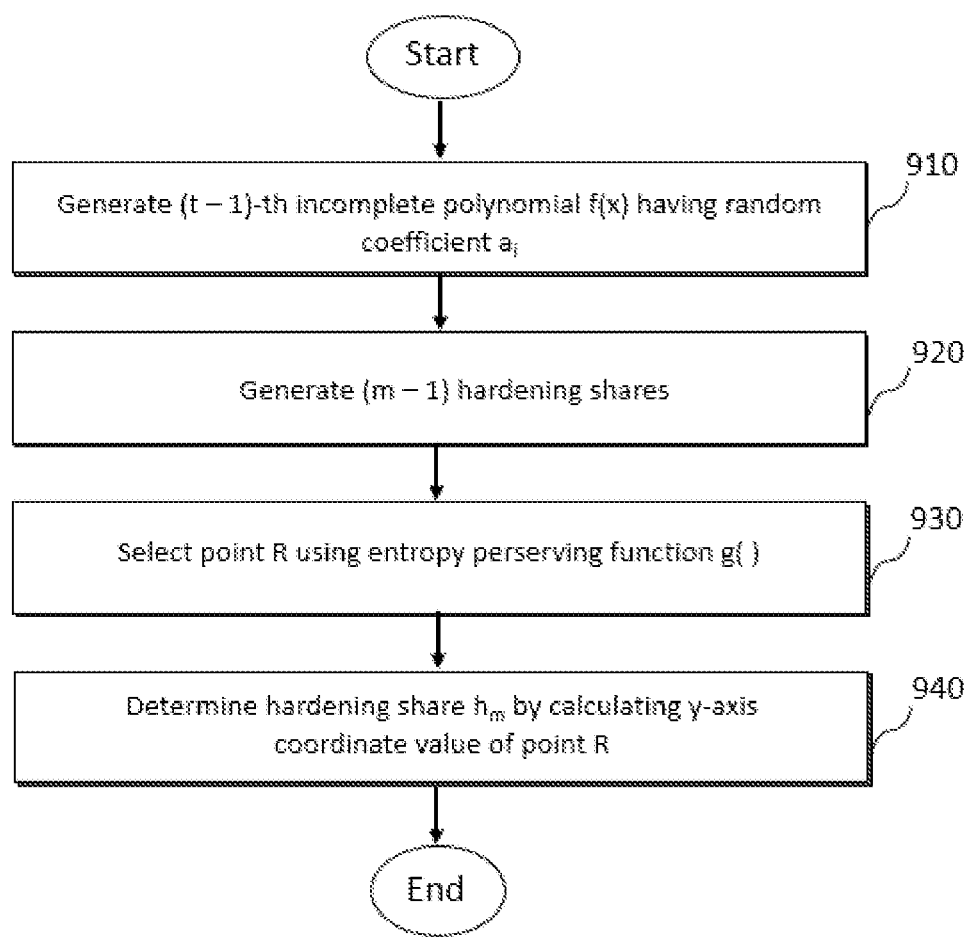
FIGS. 9A and 9B illustrate a method for generating a plurality of hardening shares from a predetermined polynomial using the constrained point selection technique according to various exemplary embodiments.
Figure 9B:
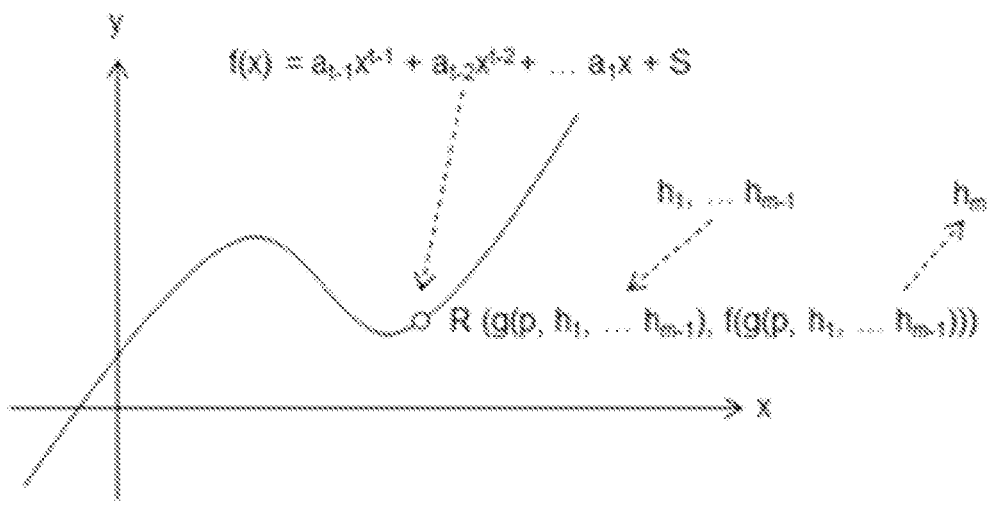

FIGS. 9A and 9B illustrate a method for generating a plurality of hardening shares from a predetermined polynomial using the constrained point selection technique.

Referring to FIG. 9A, in operation 910, the electronic device (e.g., the electronic devices 110, 120, and 130 of FIG.

1 or the electronic device 200 of FIG. 2) may generate the polynomial f(x) of degree (t−1) including the random coefficient $a_i$.

For example, the electronic device may generate a polynomial $f(x)=a_{t-1}x^{t-1}+a_{t-2}x^{t-2}+\ldots+S$ which has the random coefficient $a_i$.

In operation 920, the electronic device (e.g., the electronic devices 110, 120, and 130 of FIG. 1 or the electronic device 200 of FIG. 2) may randomly generate (m−1) hardening shares.

For example, the electronic device may randomly generate (m−1) hardening shares $h_1, h_2, \ldots h_{m-1}$. According to an exemplary embodiment, the electronic device may generate one or more hardening shares having randomness and sufficient entropy.

In operation 930, the electronic device (e.g., the electronic devices 110, 120, and 130 of FIG. 1 or the electronic device 200 of FIG. 2) may select the point R using the entropy preserving function g( ) For example, the electronic device may select a point R at which the x-axis coordinate value is $g(p, h_1, h_2, \ldots, h_{m-1})$ using g( ) For example, referring to FIG. 9B, the electronic device may select a point $R(g(p, h_1, h_2, \ldots, h_{m-1}), f(g(p, h_1, h_2, \ldots, h_{m-1})))$.

According to various exemplary embodiments, the entropy preserving function g( ) may include an encryption algorithm, a one way function, a pseudo random generator, and a pseudo random function. For example, the XOR encryption may be used, and when the XOR operator is represented by $\oplus$, $g(p, h_1, h_2, \ldots, h_{m-1})=p\oplus h_1 \oplus h_2 \oplus \ldots \oplus h_{m-1}$ may be established.

In operation 940, the electronic device (e.g., the electronic devices 110, 120, and 130 of FIG. 1 or the electronic device 200 of FIG. 2) may determine the hardening share $h_m$ by calculating the y-axis coordinate value of the point R.

For example, $h_m = f(g(p, h_1, h_2, \ldots, h_{m-1}))$, and the aggregate share may become $R(g(p, h_1, h_2, \ldots, h_{m-1}), h_m)$.

Referring back to FIG. 7, in operation 750, the electronic device (e.g., the electronic devices 110, 120, and 130 of FIG. 1 or the electronic device 200 of FIG. 2) may generate the full share based on the polynomial.

Although not illustrated, the electronic device distributes the generated full shares to participants of a number corresponding to the number of full shares to the share the secret.

Third Exemplary Embodiment (Constrained Point Selection Technique)

An exemplary embodiment in which the present disclosure is applied to Shamir secret sharing on a finite field $F_q$ will be described. For convenience of calculation, 13 which is a prime number is assumed as a value of q. As a result, the secret S, the coefficient $a_i$, the coordinate value, and the shares used in the secret sharing are all defined in $F_{13}$.

It is assumed that the secret value is determined as S=3 and the predetermined share is determined as p=5, and m hardening shares are generated.

When it is assumed that the randomly generated quadratic polynomial is $f(x)=x^2+9x+3$ and three full shares $V_1=0$, $V_2=12$, and $V_3=0$ may be acquired from three points (1, f(1)), (2, f(2)), and (3, f(3)) through which the f(x) passes.

1) When the single hardening share is generated (m=1), a point R at which the x-axis coordinate value is p=5 (=0101) may be selected among points which exist in f(x). The y-axis coordinate value of the point R becomes the hardening share h, that is, h=f(p)=f(5)=8. In this case, the coordinate of the point R is (5, 8).

2) When the plurality of hardening shares is generated (m>1), m=3 is assumed. Two hardening shares $h_1$ and $h_2$ are first randomly generated, and the acquired values may be $h_1=6$ (=0110) and $h_2=8$ (=1000), respectively. Using the XOR encryption as the function g( ) a point R at which the x-axis coordinate value is $p\oplus h_1 \oplus h_2$ is selected. $p\oplus h_1 \oplus h_2$ may be calculated as follows.

$$p \oplus h_1 \oplus h_2 = 0101 \oplus 0110 \oplus 1000 = 1011 (=11)$$

Since the y-axis coordinate of the point R $(p\oplus h_1 \oplus h_2, f(p\oplus h_1 \oplus h_2))$ is chosen as the last hardening share $h_3$, $h_3$ may be calculated as follows.

$$h_3 = f(p \oplus h_1 \oplus h_2) = f(11) = 223 = 1 (\mod 13)$$

Figure 10A:
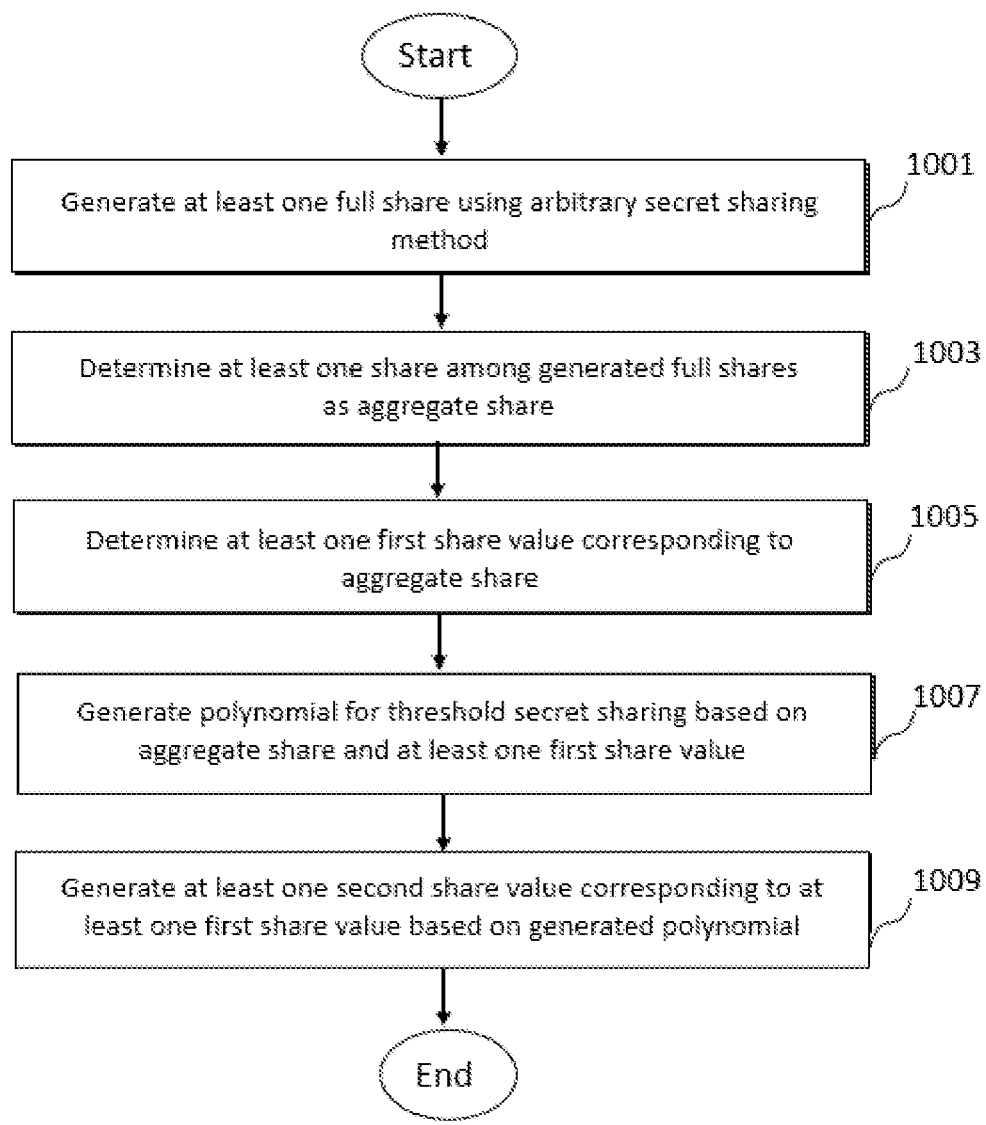
FIGS. 10A and 10B illustrate a hierarchical share generation method of a share hardening method for multi-factor threshold secret sharing according to various exemplary embodiments.
Figure 10B:
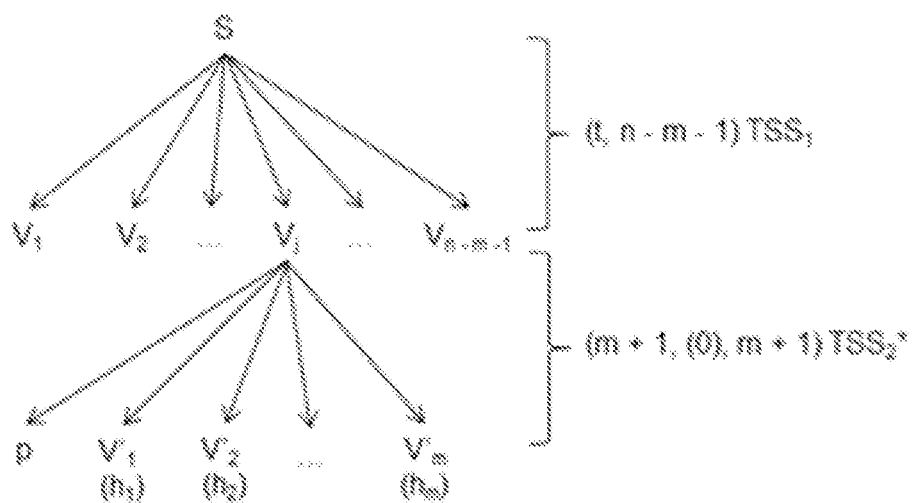

FIGS. 10A and 10B illustrate a hierarchical share generation method of a share hardening method for multi-factor threshold secret sharing according to various exemplary embodiments. In FIGS. 10A and 10B, the secret sharing method generates the partial share separately in two levels, for the convenience of description, but various exemplary embodiments of the present disclosure are not intended to be limited to two levels, and may be extended to a plurality of levels, and executed.

Referring to FIG. 10A, in operation 1001, the electronic device (e.g., the electronic devices 110, 120, and 130 of FIG. 1 or the electronic device 200 of FIG. 2) may generate at least one full share using an arbitrary secret sharing method.

For example, the electronic device may generate (n−m−1) full shares $V_1, V_2, \ldots, V_{n-m-1}$ of a first level based on a complete first polynomial $f_1(x)$ using an arbitrary secret sharing method $TSS_1$. According to various exemplary embodiments of the present disclosure, a hierarchical share generation method may use the Blakely method using the geometric object or other conventional secret sharing methods in the first level, and does not limit the secret sharing method which may be used in the first level.

In operation 1003, the electronic device (e.g., the electronic devices 110, 120, and 130 of FIG. 1 or the electronic device 200 of FIG. 2) may determine at least one share among the generated full shares as the aggregate share.

Referring to FIG. 10B, for example, the electronic device may select one share $V_j$ among the shares generated in the first level and determine the selected share $V_j$ as the aggregate share.

In operation 1005, the electronic device (e.g., the electronic devices 110, 120, and 130 of FIG. 1 or the electronic device 200 of FIG. 2) may determine at least one first share value corresponding to the aggregate share. The first share (or referred to as 'predetermined share') means, for example, a share predetermined by the user, such as the password or biometric information, and may be expressed as a unique value. When a password which is memorizable or biometric information such as fingerprint may be used as the share, a separate device for keeping the share is not required, and the usability of secret sharing may be significantly improved due to excellent accessibility.

In operation 1007, the electronic device (e.g., the electronic devices 110, 120, and 130 of FIG. 1 or the electronic device 200 of FIG. 2) may generate the polynomial for threshold secret sharing based on the aggregate share and at least one first share value.

For example, the electronic device may generate a complete polynomial $f_2(x)$ defining a second level. For example, the electronic device may determine a point R (k, p) having an arbitrary value k as the x-axis coordinate value and the first share (predetermined share) p as the y-axis coordinate value. Thereafter, the electronic device may generate a polynomial of degree m $f_2(x)=a_m x^m + a_{m-1} x^{m-1} + \ldots$, $V_j$ by randomly generating the remaining coefficients other than one coefficient $a_i$, and then determine the coefficient $a_i$ so that $f_2(x)$ passes through the point R.

In operation 1009, the electronic device (e.g., the electronic devices 110, 120, and 130 of FIG. 1 or the electronic device 200 of FIG. 2) may generate at least one second share value corresponding to at least one predetermined first share value based on the generated polynomial.

For example, the electronic device selects m different points other than R among the points of the polynomial $f_2(x)$ to generate each y-axis coordinate value of each point as the second share (hardening share).

Referring to FIG. 10B, for example, the electronic device may determine shares $V'_1, V'_2 \ldots, V'_m$ generated in the second level as the second shares (hardening shares). In FIG. 10B, the arbitrary conventional secret sharing method used in the first level is expressed as $TSS_1$, and since the secret sharing method used in the second level uses the polynomial based on the first share (predetermined share), the secret sharing method in the second level is expressed as $TSS^*_2$ in order to distinguish from the conventional secret sharing method.

The hierarchical share generation technique may generate the partial share which satisfies property 2 when a perfectly secure polynomial-based secret sharing method is used in the second level. In that case, the aggregate share may not be found by (m−1) hardening shares.

Fourth Exemplary Embodiment (Hierarchical Share Generation Technique)

An exemplary embodiment in which the present disclosure is applied to Shamir secret sharing on a finite field $F_q$ will be described. For convenience of calculation, a prime number 13 is assumed as a value of q. As a result, the secret S, the coefficient $a_i$, the coordinate value, and the share used in the secret sharing are all defined in $F_{13}$.

It is assumed that the secret value is determined as S=3 and the predetermined share is determined as p=5, and two hardening shares for (3, (2), 4) secret sharing are generated.

In the first level, the quadratic polynomial $f_1(x)=x^2+9x+3$ is determined using the Shamir method, and then two shares $V_1=0$ and $V_2=12$ may be generated from two points (1, f1(1)) and (2, f1(2)). $V_2$ is selected among the generated shares and determined as the aggregate share.

In the second level, $V_2=12$ is set as the secret, and the predetermined share p=5 is used to determine the coordinate of the point R as (3, 5). The quadratic polynomial $f_2(x) = a_2 x^2 + a_1 x + a_0 = x^2 + 12x + 12$ which passes through the point R may be generated with a randomly generated coefficient $a_1$. Two hardening shares $h_1=12$ and $h_2=1$ may be generated from (1, $f_2(1)$) and (2, $f_2(2)$) through which $f_2(x)$ passes.

Figure 11:
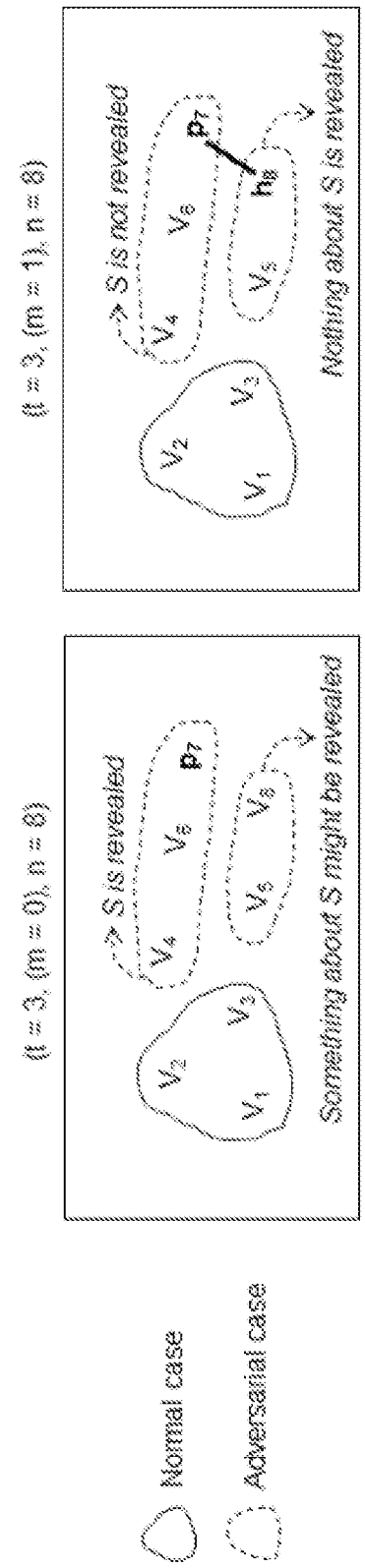
FIG. 11 illustrates a threshold secret sharing method that uses a hardening share compared with a threshold secret sharing method that does not use a hardening share according to various exemplary embodiments.

FIG. 11 illustrates a threshold secret sharing method that uses a hardening share compared with a threshold secret sharing method that does not use a hardening share according to various exemplary embodiments.

Referring to FIG. 11, (3, (0), 8) secret sharing which uses the predetermined share, but does not use the hardening share and (3, (1), 8) secret sharing using both the single predetermined share and the hardening share according to various exemplary embodiments of the present disclosure are compared.

In the (3, (0), 8) secret sharing method, when the adversary acquires two shares, it may be possible to deduce information on the secret S using vulnerability of a predetermined share $p_7$. However, in the (3, (1), 8) secret sharing method, the secret S may not be found by two shares and no information on S may not also be deduced.

Referring to FIG. 11, according to various exemplary embodiments of the present disclosure, the (3, (1), 8) secret sharing method may cause more cost than the (3, (0), 8) secret sharing method when reconstructing the secret in a normal case. The reason is that a total of four shares are required to reconstruct the secret in the (3, (1), 8) secret sharing method while only three shares are required in the (3, (0), 8) secret sharing method. However, the (3, (1), 8) secret sharing method is more secure than the (3, (0), 8) secret sharing method, and the use of a password or biometric information as the predetermined share may further provide improve security and usability, so there may be trade-off.

Figure 12:
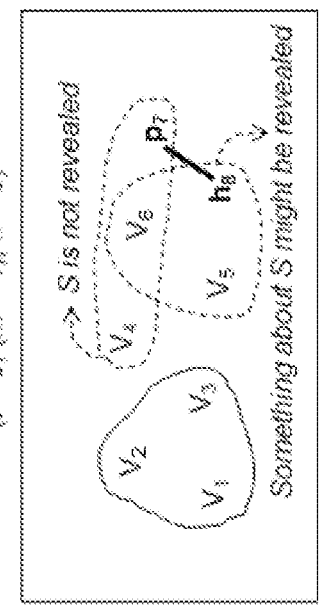
FIG. 12 illustrates the share hardening method for multi-factor threshold secret sharing compared with the conventional technique according to various exemplary embodiments.
Figure 12:
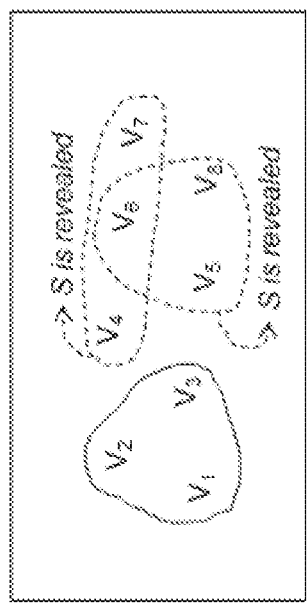

FIG. 12 illustrates the share hardening method for multi-factor threshold secret sharing compared with the conventional technique according to various exemplary embodiments.

Referring to FIG. 12, (3, 8) secret sharing which does not use the predetermined share and (3, (1), 8) secret sharing using both the predetermined share and the hardening share are compared. In the (3, 8) secret sharing method, when the adversary acquires three arbitrary shares, the secret S may be found. In the (3, (1), 8) secret sharing method, when the hardening share and the predetermined share are not included in three shares acquired by the adversary, the secret S may be found similarly to the (3, 8) secret sharing method. However, when the predetermined share $p_7$ is included in three shares acquired by the adversary, the secret S may not be found due to property 2. Further, when a hardening share $h_8$ is included in three shares acquired by the adversary, the predetermined share $p_7$ is required, so an additional effort for finding $p_7$ is required. Therefore, the (3, (1), 8) secret sharing method has more excellent security than the (3, 8) secret sharing method.

When a threshold t is increased in the conventional (t, n) secret sharing or the (t, (0), n) secret sharing method which does not use any hardening share, the security for an attack may be increased. For example, when a (t+1, n) or (t+1, (0), n) secret sharing method is used, the adversary should acquire (t+1) shares, so the security for the attack is increased. However, when the method is compared with the (t+1, (m), n) secret sharing method, the security of the (t+1, (m), n) secret sharing method may be relatively excellent in the same scheme as the above description.

Last, when the present disclosure is applied, multi-factor secret sharing using knowledge of the user, such as the password and inherence of the user, such as the biometric information as the share is enabled. Electronic hacking for the password is impossible, and electronic hacking for the biometric information is difficult, and at the same time, a replication risk for the biometric information is also low. Further, a separate digital device for keeping the password or biometric information is not required, and moreover, the usability of the secret sharing system may be improved due to excellent accessibility.

Features, structures, and effects described in the above exemplary embodiments are included in at least one embodiment of the present disclosure, and are not particularly limited to only one exemplary embodiment. Furthermore, features, structures, and effects exemplified in each embodiment may be combined or modified for other exemplary embodiments those skilled in the art to which the exemplary embodiments pertain. Therefore, the contents related to such combinations and modifications should be interpreted as being included in the scope of the present disclosure.

In addition, although the exemplary embodiments have been mainly described above, these are merely examples and do not limit the present disclosure, and those skilled in the art to which the present disclosure pertains will be able to know that various modifications and applications not illustrated above may be made within the scope without departing from the essential characteristics of the exemplary embodiment. For example, each component specifically shown in the exemplary embodiment may be implemented by being modified. In addition, it will be interpreted that differences related to the modifications and applications are included in the scope of the present disclosure defined in the appended claims.

What is claimed is:

1. A share hardening method for multi-factor threshold secret sharing of an electronic device including a processor, the share hardening method comprising:
   accepting, by the processor, at least one predetermined first share value;
   randomly generating, by the processor, at least one second share value corresponding to the at least one predetermined first share value;
   determining, by the processor, an aggregate share using all of the at least one predetermined first share value and the at least one second share value;
   generating, by the processor, a polynomial for threshold secret sharing based on the determined aggregate share; and
   generating, by the processor, remaining full shares based on the generated polynomial,
   wherein the aggregate share is derivable only when both the at least one predetermined first share value and the at least one randomly generated second share value are aggregated, and when fully aggregated, the aggregate share corresponds to one of the full shares or to information obtainable from one of the full shares,
   wherein at least one of x-axis coordinate value and y-axis coordinate value corresponding to the aggregate share is generated using the at least one randomly generated second share and an entropy preserving function, and
   wherein the at least one predetermined first share value is a password or a biometric information having low risk of electronic hacking or replication.

2. The share hardening method for multi-factor threshold secret sharing according to claim 1, wherein generating a polynomial for threshold secret sharing based on the determined aggregate share includes
   selecting a point R corresponding to the determined aggregate share,
   generating the polynomial having a coefficient $a_i$ as a variable, and
   determining the coefficient $a_i$ so that the polynomial passes through the point R.

3. The share hardening method for multi-factor threshold secret sharing according to claim 1, wherein the entropy preserving function includes at least one of an encryption algorithm, a one way function, a pseudorandom generator, or a pseudorandom function.

4. The share hardening method for multi-factor threshold secret sharing according to claim 1, wherein the generating a polynomial for threshold secret sharing based on the determined aggregate share includes
   generating the polynomial including at least one undetermined coefficient $a_i$, and
   determining a complete polynomial by randomly determining remaining coefficients other than the at least one undetermined coefficient $a_i$.

5. A share hardening method for multi-factor threshold secret sharing of an electronic device including a processor, the share hardening method comprising:
   generating, by the processor, an arbitrary polynomial for threshold secret sharing;
   accepting, by the processor, at least one predetermined first share value;
   randomly generating, by the processor, m−1 second share values;
   determining, by the processor, an aggregate share using the at least one predetermined first share value and the generated m−1 second share values, and acquiring a last second share value; and
   generating, by the processor, remaining full shares based on the generated polynomial,
   wherein the aggregate share is derivable only when all of the at least one predetermined first share value, the randomly generated m−1 second share values and the last second share value are aggregated, and when fully aggregated, the aggregate share is one of the full shares or obtainable information by the one of the full shares,
   wherein at least one of x-axis coordinate value and y-axis coordinate value corresponding to the aggregate share is generated using the randomly generated m−1 second share values, the last second share value and an entropy preserving function, and
   wherein the at least one predetermined first share value is a password or a biometric information having low risk of electronic hacking or replication.

6. The share hardening method for multi-factor threshold secret sharing according to claim 5, wherein the determining an aggregate share using the at least one predetermined first share value and the generated m−1 second share values, and acquiring the last second share includes:
   when a single second share is generated, including an operation of selecting a point R on the generated polynomial so that an x-axis coordinate corresponds to the generated first share value and an operation of determining a y-axis coordinate value of R as a second share, and
   when a plurality of second shares are generated, selecting the point R on the generated polynomial by applying an entropy preserving function g() to the generated first share value and second share value and an operation of determining a y-axis coordinate value of R as a last second share.

7. The share hardening method for multi-factor threshold secret sharing according to claim 6, wherein the entropy preserving function includes at least one of an encryption algorithm, a one way function, a pseudorandom generator, or a pseudorandom function.

8. A share hardening method for multi-factor threshold secret sharing, the share hardening method comprising:
   generating full shares using an arbitrary secret sharing method;
   determining one share of the full shares as an aggregate share;
   accepting at least one predetermined first share value;

generating a polynomial for the threshold secret sharing based on the aggregate share and the at least one first share value; and generating at least one second share value corresponding to the at least one first share value based on the generated polynomial, wherein the at least one predetermined first share value is a password or a biometric information having low risk of electronic hacking or replication.

9. The share hardening method for multi-factor threshold secret sharing according to claim 8, wherein the generating a polynomial for the threshold secret sharing based on the aggregate share and the at least one first share value includes selecting a point R at which a y-axis coordinate value corresponds to the at least one first share value, generating the polynomial having a coefficient $a_i$ as a variable, and determining the coefficient $a_i$ so that the polynomial passes through the point R.

* * * * *